United States Patent
Sharp et al.

(10) Patent No.: US 6,263,317 B1
(45) Date of Patent: Jul. 17, 2001

(54) WEB SALES CHANNEL CONFLICT RESOLUTION SYSTEM

(75) Inventors: Shawn T. Sharp, Austin, TX (US); Edmond E. Routhier, Menlo Park, CA (US)

(73) Assignee: Fogdog, Inc., Redwood City, CA (US)

( * ) Notice: Subject to any disclaimer, the term of this patent is extended or adjusted under 35 U.S.C. 154(b) by 0 days.

(21) Appl. No.: 09/204,209

(22) Filed: Dec. 1, 1998

(51) Int. Cl.[7] .................................................. G06F 17/60
(52) U.S. Cl. ............................................................... 705/26
(58) Field of Search ..................................... 705/26, 28

(56) References Cited

U.S. PATENT DOCUMENTS

| | | | |
|---|---|---|---|
| 5,694,551 | * 12/1997 | Doyle et al. | 395/226 |
| 5,710,887 | 1/1998 | Chelliah et al. . | |
| 5,794,207 | * 8/1998 | Walker et al. | 705/26 |
| 5,799,289 | 8/1998 | Fukushima et al. . | |
| 5,893,076 | * 4/1999 | Hafner et al. | 705/28 |
| 5,953,707 | * 9/1999 | Huang et al. | 705/10 |
| 5,970,472 | * 10/1999 | Allsop et al. | 705/26 |
| 6,009,413 | * 12/1999 | Webber et al. | 705/26 |

FOREIGN PATENT DOCUMENTS

| | | | |
|---|---|---|---|
| WO 98/24040 | * 6/1998 | (WO) | G06F/17/16 |
| 99/14698 | * 9/1998 | (WO) . | |
| 99/454486 | * 3/1999 | (WO) . | |

OTHER PUBLICATIONS

Richard Karpinski, "Interconnected Storefronts Weave A Merchandising Web", Internetweek, Apr. 6, 1998, p. 14.*
Sharon Machlis, "Estee Lauder tackles Web, channel conflict", Computerworld, Jul. 6, 1998, p. 79.*
"Trilogy Simplifies Sales Channel Management with the Launch of Channel Chain", Business Wire, Nov. 9, 1998.*
"Fogdog Sports Acquires Action Gear Site Sports Universe", Sep. 7, 1999.*
Fulcher, Jim; "A Sound Foundation;" Manufacturing Systems; vol. 15, No. 4, pp. 36 & 38; Apr. 1997.*
Patterson, Perdita; "Tetley uses Crystal for forecasting sales;" PC User; n268, pp.47(1); ISSN: 0263–5760; 04 Oct. 1995.*
Daniel, Dianne; "ERP solutions not as easy as ABC;" Computing Canada; vol. 22, n25, p. 49(1); 05 Dec. 1996.*
Callaway, Erin; "Expert advice on cultivating Internet links to suppliers;" PC Week; vol. 14, n39, p. 76(2); 15 Sep. 1997.*
Moad, Jeff; "Line dancing, supply style;" PC Week; vol. 14, n31, p. 79(3); Jul. 21, 1997.*
Asbrand, Deborah; "Squeeze out excess costs with supply–chain solutions;" Datamation; vol. 43, n3, p. 62(4); Mar. 1997.*
Fujimoto, Wanda H, "Who's To Blame? A Channel Conflict Exercise", South–Western College Publishing, 1997, www.swcollege.com/marketing/gitm/gitm4e02–04.html, downloaded Oct. 4, 2000, 1 page.
"Journal of Retailing", The relationship between channel conflict and information processing (summary), www.library.northernlight.com/PC19970927550004568.html?cb=0&sc=0, downloaded Oct. 4, 2000, 2 pages.

(List continued on next page.)

Primary Examiner—V. Millin
Assistant Examiner—Forest Thompson, Jr.
(74) Attorney, Agent, or Firm—Blakely, Sokoloff, Taylor & Zafman LLP

(57) ABSTRACT

A computer system and method of operation thereof are provided that allow manufacturers and distributors of brand products to participate in the e-commerce marketplace without violating existing distribution channels. This is accomplished by providing a web based system where customers can place orders for brand name products and then allocating orders to manufacturers, distributors and retailers according to distribution channel protocols defined by the manufacturers. This ensures that sales of brand goods and services via the Internet does not violate existing distribution agreements between the manufacturers and their respective distributors and retailers.

35 Claims, 16 Drawing Sheets

OTHER PUBLICATIONS

"The McKinsey Quarterly", Channel conflict: when is it dangerous?(summary), www.library.northernlight.com/LW19980304010006617.html?cb=0&sc=0, downloaded Oct. 4, 2000, 2 pages.

Keck, et al., "Channel Conflict: The Impact of Direct Internet Sales of Personal Computers on Traditional Retail Channels", Leanne Keck et al., Oct., 1998, pp. 1–33.

* cited by examiner

WEB SALES CHANNEL CONFLICT RESOLUTION SYSTEM

CROSS-REFERENCE TO MICROFICHE APPENDIX

A portion of the present disclosure is contained on a microfiche appendix. The microfiche appendix includes sections labeled "Appendix A" and "Appendix B". Appendices A and B, contain a listing of segments of a computer program and related data, according to an embodiment of the invention. These listings of computer program contain material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention is related generally to computer system and, particularly, to computer systems for selling goods over a computer network.

2. Related Art

Due to the increasing popularity of the Internet, e-commerce (i.e., the sale goods and services over the Internet) has become one of the fastest growing sectors of the economy. Typical systems used to support e-commerce employ websites to attract on-line customers. The around-the-clock accessibility of these websites, in addition to the ability to directly access a large number of products, affords customers of e-commerce websites a more convenient and less time consuming shopping experience.

However, when a customer places an order through a current e-commerce website, the order is directly filled by the owner of the website, which is typically a manufacturer or a distributor of the products sold through the website. This may be undesirable for both manufacturers and distributors of brand-name products, as it creates internal competition between the manufacturer and distributors at various levels in the distribution chain. As a result, manufacturers and mass distributors of a brand product may be prevented from taking advantage of the e-commerce marketplace to avoid undermining existing distribution agreements with downstream distributors and retailers.

SUMMARY OF THE INVENTION

The present invention provides a computer system and method of operation thereof that allow manufacturers and distributors of brand-name products to participate in the e-commerce marketplace without violating existing distribution channels and creating channel conflict. This is accomplished by providing a web based system where customers can place orders for brand-name products and then allocate orders to manufacturers, distributors and retailers according to distribution channel protocols defined by the manufacturer. This ensures that sales of brand-name goods and services via the Internet do not violate existing distribution agreements between the manufacturers and their respective distributors and retailers.

BRIEF DESCRIPTION OF THE DRAWINGS

FIG. 16 is a static image of a web page displayed on a screen of a computer connected to the server computer of FIG. 1 once the order allocation functions described with respect to FIG. 4 have been carried out.

DETAILED DESCRIPTION OF THE INVENTION

Figure 1:
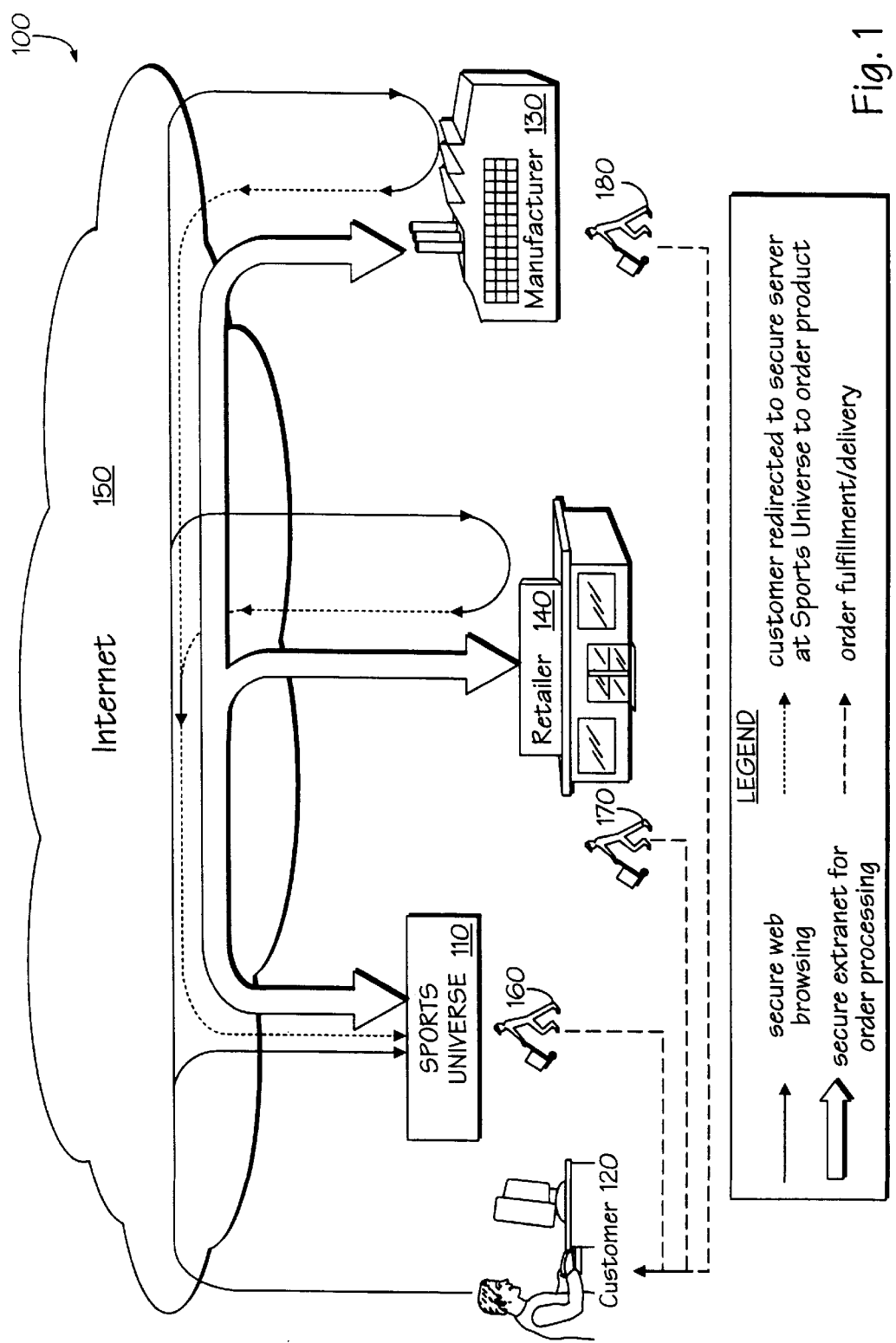
FIG. 1 is a block diagram of a web sales channel conflict resolution system, in accordance to an embodiment of the invention.

FIG. 1 is a block diagram of a computer system 100 that provides a sales channel conflict resolution solution, in accordance to an embodiment of the invention. Computer system 100 includes one or more server computers 110, one or more client computers 120, one or more manufacturer computers 130 and one or more distributor computers 140, all connected by means of computer network 150. Server computers 110, client computers 120, manufacturer computers 130 and distributor computers 140 can be any type of general purpose computers known in the art, which have sufficient processing power to handle the processing needs of computer system 100. In some cases, server computers 110, client computers 120, manufacturer computers 130 and distributor computers 140 may perform functions in addition to those associated with the operation of computer system 100. In such cases, server computers 110, client computers 120, manufacturer computers 130 and distributor computers 140 will have sufficient processing power to handle both functions related to the operation of computer system 100, as well as such additional functions. Furthermore, network interfaces between computer network 150 on one end and server computers 110, client computers 120, manufacturer computers 130 and distributor computers 140 on the other end, provide sufficient bandwidth to allow for efficient operation of computer system 100, as well as of processing of any additional functions performed by each of the computers.

In some embodiments, server computers 110, client computers 120, manufacturer computers 130 and distributor computers 140 are Pentium-based 200Mhz MMX® PC-compatible computers with 64 MB of RAM and 56 k modems for connecting to computer network 150. In some embodiments, computer network 150 is the Internet. In such embodiments, server computers 110, client computers 120, manufacturer computers 130 and distributor computers 140 use modems to connect to Internet 150 via Internet Service Providers (ISPs). However, those skilled in the art realize that other types of communication links between server computers 110, client computers 120, manufacturer computers 130 and distributor computers 140 and computer network 150 can be used, such as ISDN, T1 or T3 lines or modems operating at speeds other than 56 k. Accordingly, the invention is not limited to any particular type of connection between server computers 110, client computers 120, manufacturer computers 130 and distributor computers 140 and computer network 150. In addition, computer network 150 can be any type of computer communication network, such as a local area, wide area or global computer network.

Using computer system 100, a customer using client computer 120 can access an e-commerce website hosted on server computer 110 via computer network 150. The e-commerce website allows the customer to select among a large assortment of products from different manufacturers. In some embodiments, the products sold through the e-commerce website relate to a particular market segment, such as extreme sports equipment and apparel. The e-commerce website allows the customer to place multiple orders for multiple products and/or services in a single session. The order includes both information about the product, such as manufacturer, model number and selected options, as well as information about the customer, such as name, address and credit information. Once the customer has entered and confirmed the order, a computer program executed on server computer 110 processes the order. The computer program allocates the order to a supplier of the product according to a distribution channel conflict resolution scheme specified by the manufacturer of the product. According to the distribution channel conflict resolution scheme, an order can be allocated either to the owner of the website, or to a distributor selected according to the protocol, or to the distributor for direct distribution. The term distributor is used herein to include distributors of a product at all levels in the distribution chain, including retailers. If the order is allocated to either a distributor or to the manufacturer, the order is transmitted to a distributor computer 140 or to a manufacturer computer 130 via a secure extranet communication link established over computer network 150. In order to be able to fill orders, the owner of the website may maintain a warehouse of products by various manufacturers, where the products are held on consignment on behalf of the manufacturer.

After the order is assigned, the product is shipped to the customer either from the warehouse maintained by the owner of the website 160, or from the distributor 170 or from the manufacturer 180, depending on the results of the order allocation process.

Figure 2:
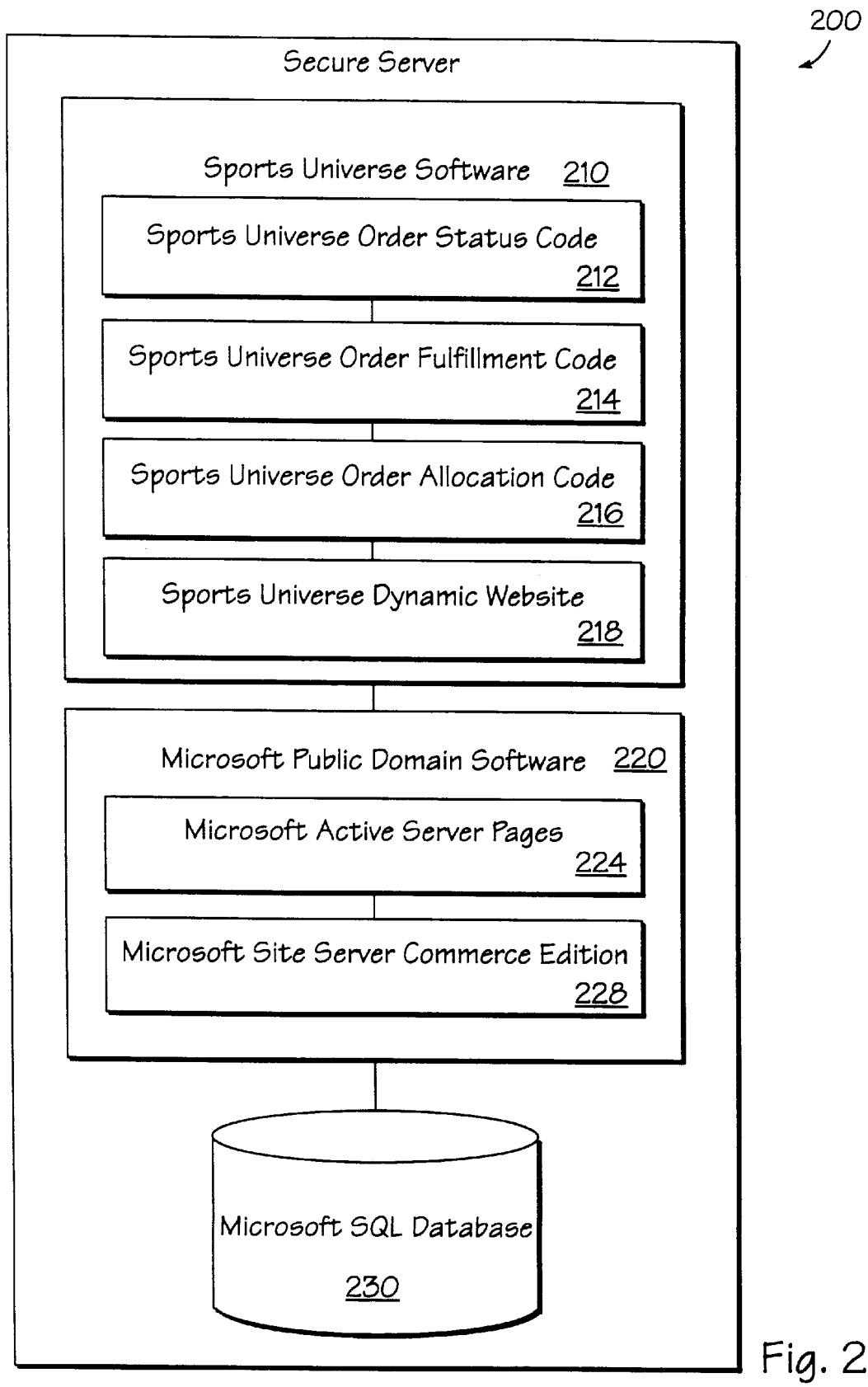
FIG. 2 is a block diagram of the structure of the software components of the web sales channel conflict resolution system of FIG. 1 residing on a server computer.

FIG. 2 is a block diagram of the structure of the secure server software 200 executed by server computer 110. Secure server software 200 includes order processing software 210, infrastructure software 220 and database 230. Order processing software 210, in turn, includes order status code 212, order fulfillment code 214, order allocation code 216 and dynamic website code 218. Infrastructure code 220 includes Microsoft's Active Server Pages (ASP) code 224 and Site Server Commerce Edition 228, available from Microsoft Corp. of Redmond, Wash. Database 230 is any suitable database known in the art, such as the Microsoft SQL database, available from Microsoft Corp. of Redmond, Wash. Those skilled in the art realize that dynamic web page environments other than ASP and databases other than Microsoft's SQL database can be used in accordance to the principles of the invention.

Figure 3:
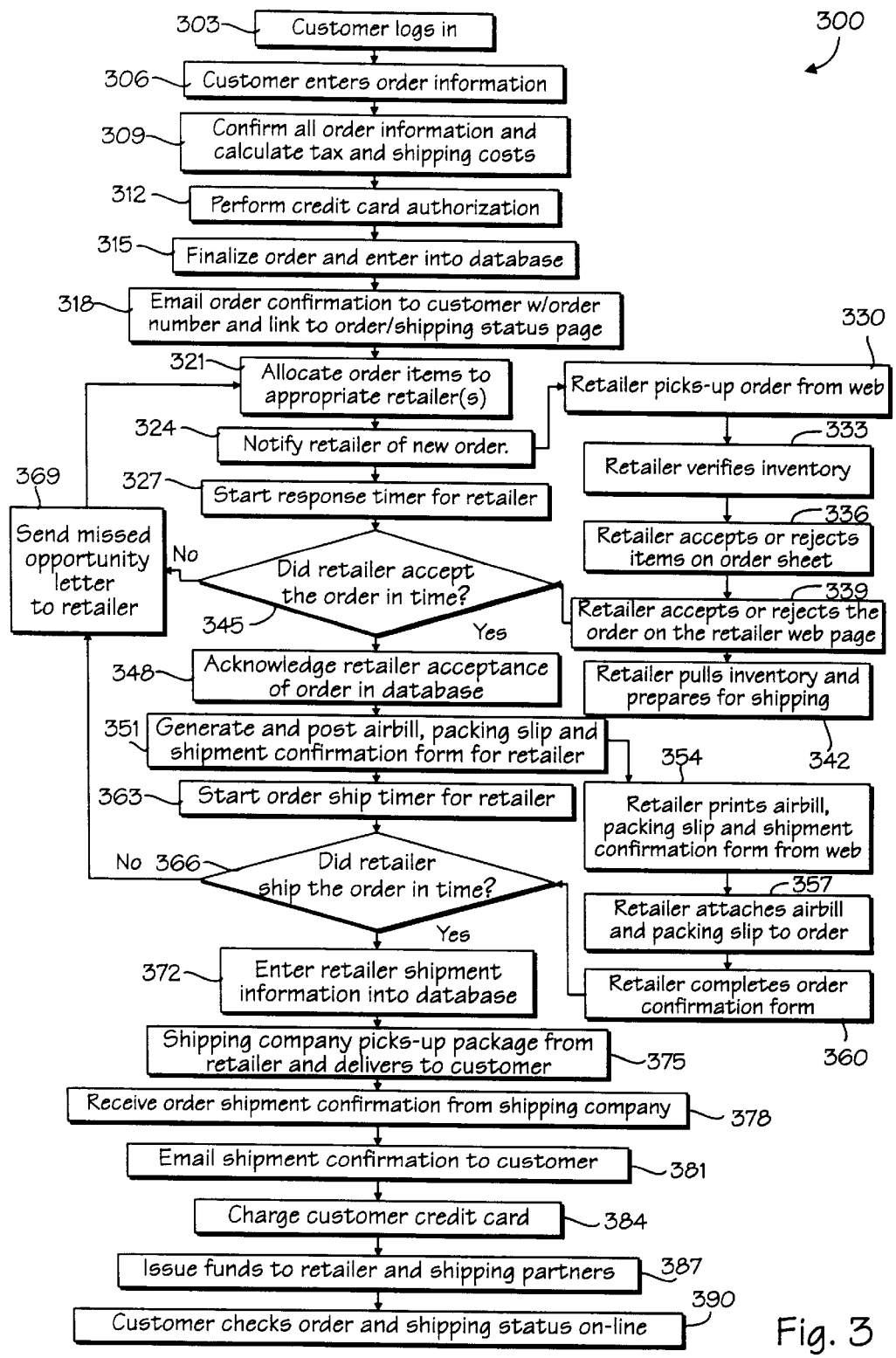
FIG. 3 is a flow diagram of the operation of computer system 100 of FIG. 1.

FIG. 3 is a flow diagram of the operation 300 of computer system 100 of FIG. 1. First, a customer browses or logs-in to an e-commerce website hosted by server computer 110 via client computer 120 and computer network 150 in stage 303. The customer then enters the order information in stage 306. The customer then confirms the order information causing the computer program executed by server computer 110 to compute tax and shipping costs and add to the order information, all in stage 309. The credit card or other payment information submitted by the customer is verified and processed in stage 312. If verification for the payment information is not obtained, the customer is asked to re-enter the information or provide alternative payment information. Once the payment information has been successfully verified, the order is finalized and entered into database 230 in stage 315. Order confirmation information, including an order number and a link to an order/shipping information web page, is e-mailed to the customer in stage 318.

The order is then allocated to a supplier according to a web sales channel conflict resolution protocol specified by the manufacturer in stage 321. The supplier is then notified of the new order in stage 324. The new order notification can be effected in any manner known in the art, such as e-mail, fax or telephone. In some embodiments, an e-mail message is sent to distributor computer 140 or to manufacturer computer 130 where an e-mail reader program is activated to play a sound recording message to alert the supplier of the new order. A response timer for the supplier is then started in stage 327. Upon receiving the new order notification, the supplier logs on to the website executed by server computer 110 to retrieve the new order information in stage 330. The supplier then verifies its inventory in stage 333 to determine whether it should accept or reject the order in stage 336. The supplier then enters the order acceptance or rejection information onto the web page in stage 339.

Stage 345 determines whether the selected supplier has accepted the order in time, in which case operation 300 proceeds to stage 348. Otherwise, a missed opportunity letter is sent to the retailer in stage 369 and stages 321 to 345 are repeated until the order is allocated to a supplier that accepts the order in time. Database 230 is updated to reflect the supplier's timely acceptance of the order in stage 348. An airbill, packing slip and other shipment information are then generated by server computer 110 in stage 351 and an order ship timer for the supplier is started in stage 363. In stage 354, the supplier prints the airbill, packing slip and shipment confirmation information form using distributor computer 140 or manufacturer computer 130. All shipping materials generated in stages 351 and 354 reflect the owner of the website as the shipping party, regardless of the distribution channel actually used to ship the product, making the actual distribution channel conflict resolution process transparent to the user. The supplier then attaches the airbill and packing slip to the shipment in stage 357. The supplier completes the order confirmation form on the website in stage 360. Stage 366 then determines whether the supplier entered shipment confirmation information on for the product on time, in which case operation 300 proceeds to stage 372. Otherwise, a missed opportunity letter is sent to the supplier in stage 369 and stages 321–366 are repeated until the order is accepted and the corresponding product is shipped on time.

Those skilled in the art realize that most of the functions described in stages 321 to 369 can be performed with varying degrees of interaction between computer system 100 and one or more human users. Accordingly, the specific functions described in stages 321 to 369 are only illustrative in nature and do not limit the invention. In fact, other implementations such as an entirely automated order allocation and distribution process may be used in lieu of the process described with respect to stages 321 to 369 in accordance to principles of the invention.

Furthermore, while the description of the functions performed in stages 321 to 369 are described in reference to order filled by a distributor or by the manufacturer, those skilled in the art readily realize how analogous processing steps can be implemented to fill the order from a warehouse maintained by the owner of the website.

Once the product has been timely shipped by the supplier, database 230 is updated to reflect the shipment information in stage 372. A shipping company then picks the product from the supplier and delivers it to the customer in stage 375. An e-mail confirmation message is sent to the customer in stage 381. The customer credit card, or other payment instrument, is debited with the cost of the product plus any applicable taxes and shipping and handling charges in stage 384. Funds are transferred to the supplier and the shipping company to cover the cost of the product and the shipping charges in stage 387. Finally, in stage 390, the customer verifies order and shipping status by accessing the e-commerce website on-line using the order and link information supplied in stage 318.

Figure 4:
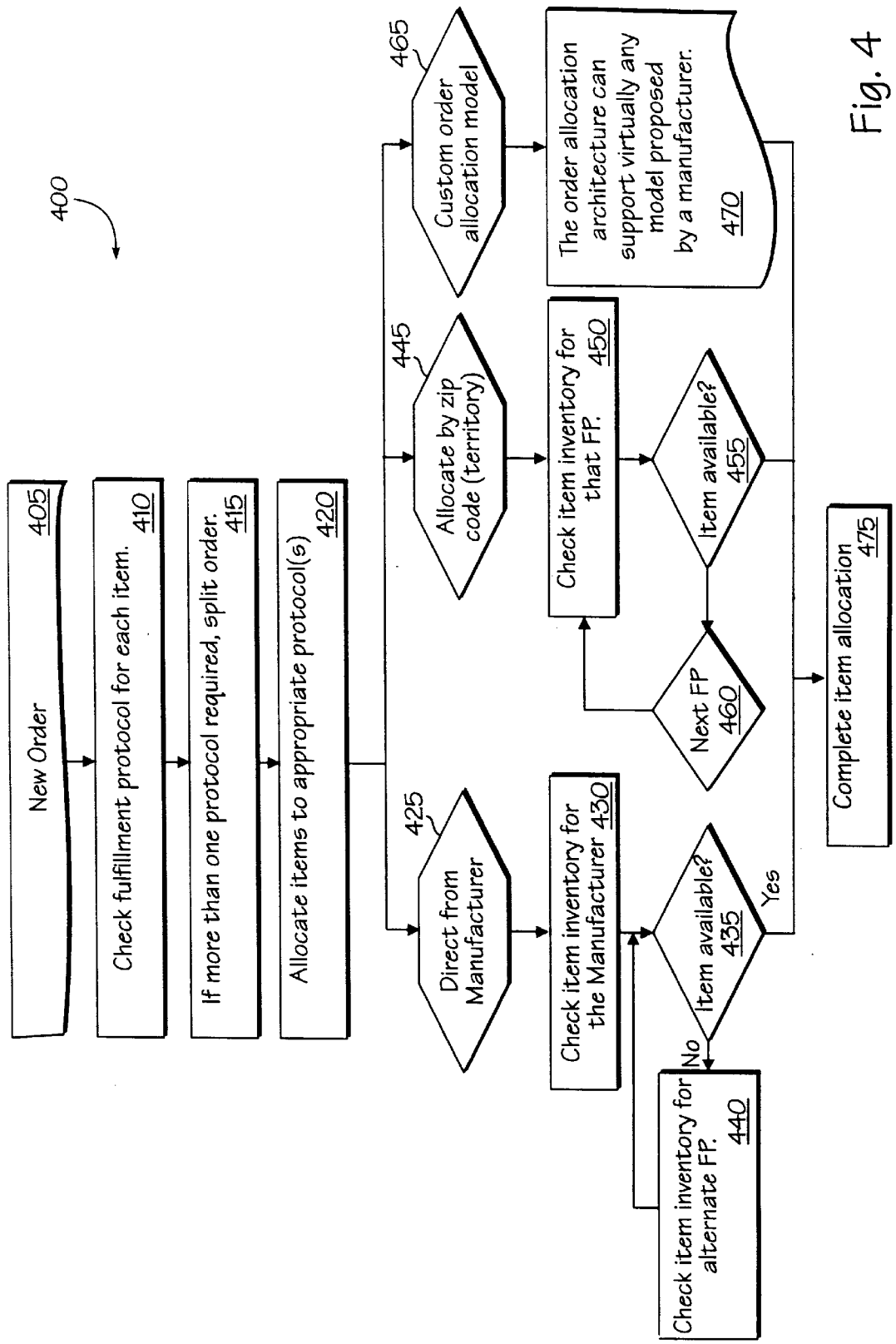
FIG. 4 is a flow diagram of the operation of a distribution channel conflict resolution scheme, in accordance to an embodiment of the invention.
Figure 5:
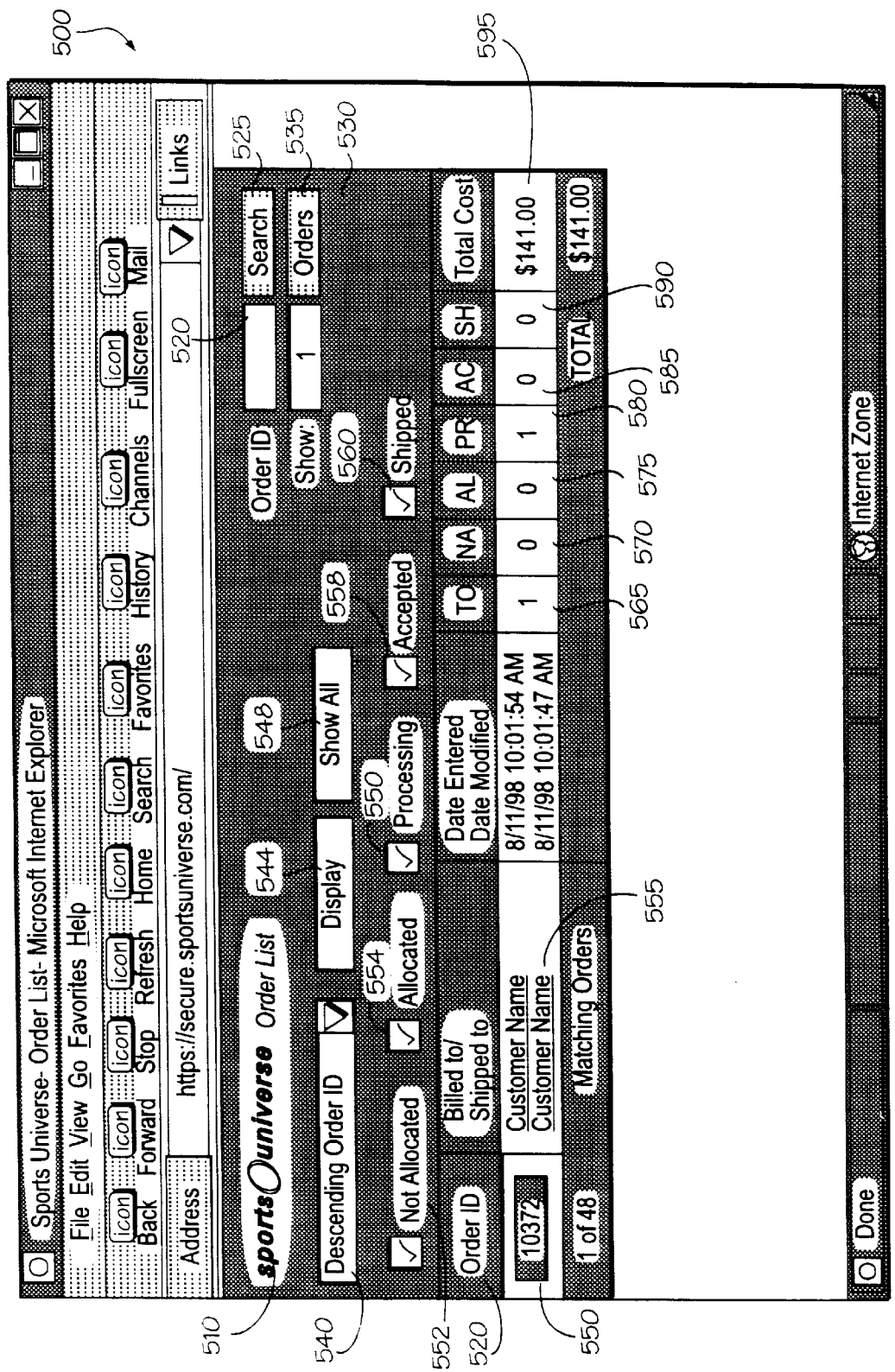
FIGS. 5–8 are static images of the web pages displayed on a screen of a computer connected to the server computer of FIG. 1 to manually carry out the order allocation functions described with respect to FIG. 4.

The order allocation process of stage 321 is described in greater detail in FIG. 4. FIG. 4 is a flow diagram of operation 400 of a distribution channel conflict resolution scheme, in accordance to an embodiment of the invention.

First, a new order is entered in stage 405, as described with respect to stages 303 to 318 of FIG. 3. A fulfillment protocol supplied by the manufacturer is then checked for each product in the order in stage 410. Stage 415 then determines whether one or more protocols are required to fill the entire order. If more than one protocol is required to fill the order, the order is subdivided according to the protocols and the successive stages are repeated once for each protocol required to fill the order. Each item in the order is allocated to a corresponding protocol in stage 420. Stage 425 then determines whether the order is to be filled directly by the manufacturer, in which case operation 400 proceeds to stage 430. Otherwise, operation 400 proceeds to stage 445. The manufacturer's inventory is checked in stage 430 to determine whether the manufacturer can fill the order in stage 435, in which case operation 400 proceeds to stage 475. Otherwise, the inventory of an alternative supplier is checked in stage 440 and stages 435 and 440 are repeated until a supplier with available inventory is located or it is determined that all suppliers are out of stock for the ordered product.

Stage 445 determines whether the order is to be allocated to a distributor according to zip code or other geo-based allocation scheme, in which case operation 400 proceeds to stage 450. Otherwise, operation 400 proceeds to stage 465. The inventory of the selected distributor is then checked in stage 450 to determine whether the selected distributor can fill the order in stage 465, in which case operation 400 proceeds to stage 475. Otherwise, an alternate distributor is selected in stage 460 and stages 450 to 460 are repeated until a distributor with available inventory to fill the order is located, or it is determined that all distributors are out of stock of the ordered product.

Stage 465 determines whether the order is to be filled according to a custom protocol specified by the manufacturer for the ordered product, in which case operation 400 proceeds to stage 470. The custom protocol specified by the customer is carried out in stage 470 and the operation proceeds to stage 475. Finally, in stage 475, the order allocation process is completed and operation 400 terminates.

FIGS. 5–8 are static images of the web pages displayed on a screen of a computer connected to server computer 110 to manually carry out the functions described with respect to stages 420–475 of FIG. 4.

Order list page 500 includes a header area 510 and a list area 520. Header area 510, in turn, has an order ID field 520, a search button 525, a show field 530, an orders button 535, a sort menu 540, a display button 544, a show all button 548, a not allocated check box 552, an allocated check box 554, a processing check box 556, an accepted check box 558 and a shipped check box 560. Order list page 500 can be used by a human operator of a computer connected to server computer 110, or of server computer 110 itself, to manually allocate orders to suppliers according to a protocol specified by the manufacturer of the product being allocated. Using header area 510, the operator controls which of the orders placed by customers and stored in database 230 are displayed in list area 520. The operator can search for a specific order by entering an order ID in order ID field 520 and then pressing search button 525. The operator further controls the number of orders shown in response to the search, by entering the maximum number of desired results in show field 530 and then pressing orders button 535. Alternatively, the operator can display all orders stored in database 230 by pressing show all button 548 or select appropriate categories of orders to be displayed by pressing any combination of check boxes 552, 554, 556, 558 and 562 and then pressing display button 544. The operator further controls the criteria according to which the orders displayed in list area 520 are displayed by selecting one of the entries in sort menu 540.

Each of the orders displayed in list area 520 includes an order ID button 550, a customer name 555, a total order number 565, a not allocated number 570, an allocated number 575, a processing number 580, an accepted number 585, a shipped number 590 and a total cost 595. Thus, by displaying an order on order list page 500, the operator can quickly monitor the processing status of the order. In addition, the operator can modify the processing status of the order by pressing order ID button 550, causing order processing page 600 to be displayed.

Figure 6:
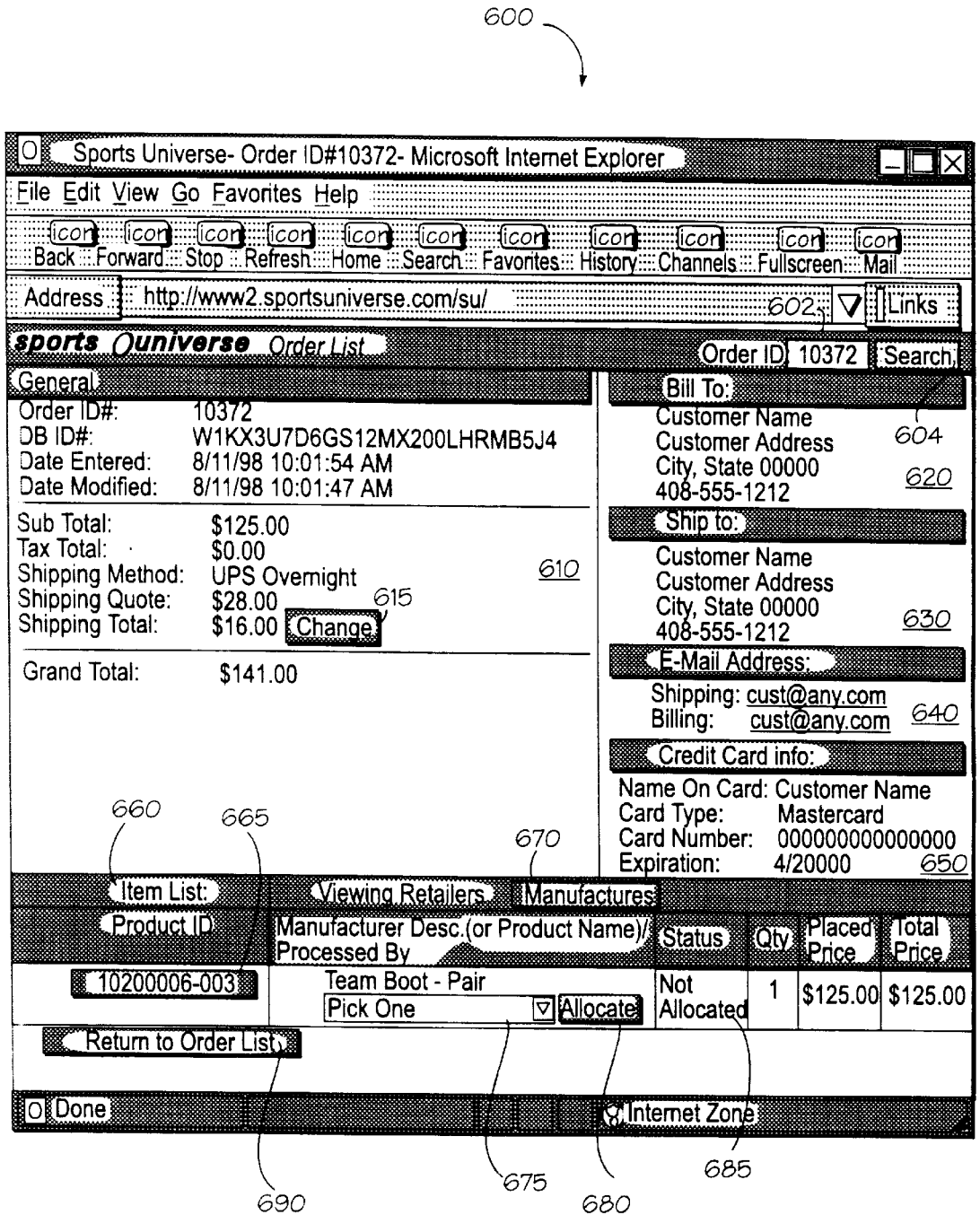

Order processing page 600 is illustrated in FIG. 6. Order processing page 600 includes a general order information area 610, listing information such as the order ID, the date the order was entered and last modified, the order total and shipping information. In addition, order processing page 600 includes billing address 620, shipping address 630, e-mail addresses 640, credit card information 650 and item list 660. Item list 660, in turn, contains information for each of the items in the order displayed in order processing page 600. The operator can control the order displayed in order processing page 600 by entering a new order ID in order ID field 602 and then pressing search button 604. Item list 660 contains a product ID button 665 and a status 685 for each item in the order. The operator can cause product detail page 1300 (FIG. 13) to be displayed by pressing product ID button 665.

Figure 7:
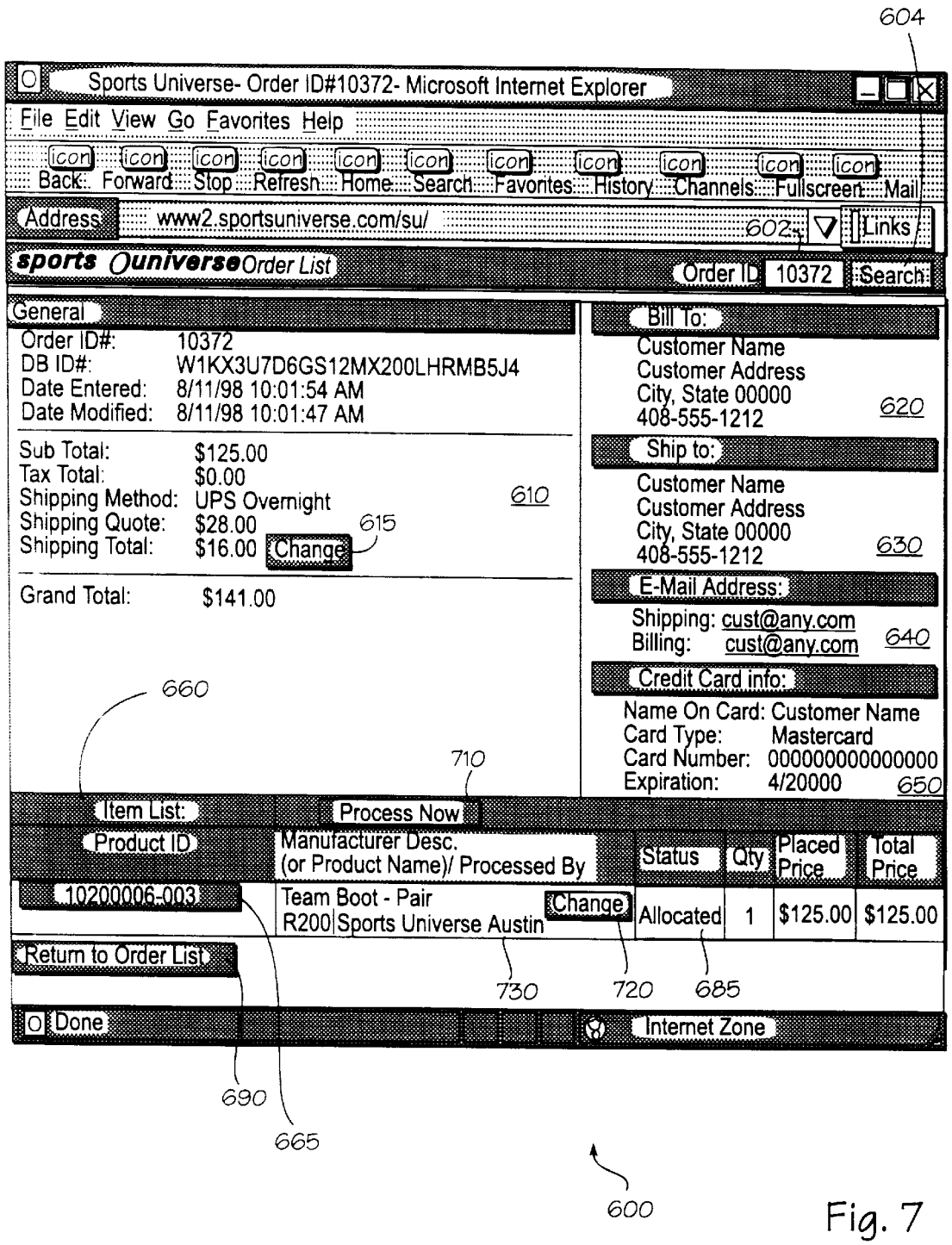

FIG. 6 shows order processing page 600 when an order that is in a not allocated status is displayed. In this configuration, order processing page 600 includes a manufacturers button 670, a suppliers menu 675 and an allocate button 680. Following a channel conflict resolution protocol specified by the manufacturer, the operator controls whether the order is to be allocated to a distributor or a manufacturer by toggling manufacturers button 670. A corresponding list of manufacturers or distributors is then provided in suppliers menu 675 and the operator selects the desired supplier from the menu and presses allocate button 680, causing status 685 to be updated, as shown in FIG. 7. Finally, the operator can go back to order list page 500 by pressing order list button 690 at any point during the processing of the order.

FIG. 7 illustrates order processing page 600 when an order in allocated state is displayed in item list 660. Supplier menu 675 is replaced in FIG. 7 by supplier 730, which indicates the supplier selected in FIG. 6. In addition, status 685 reflects the status of the order as allocated and allocate button 680 is replaced by change button 720. The operator can change the supplier indicated by supplier 730 by pressing change button 720, causing order page 600 to go back to the configuration shown in FIG. 6. Alternatively, the operator can start processing of the order by pressing process now button 710, causing status 685 to be updated, as shown in FIG. 8.

Figure 8:
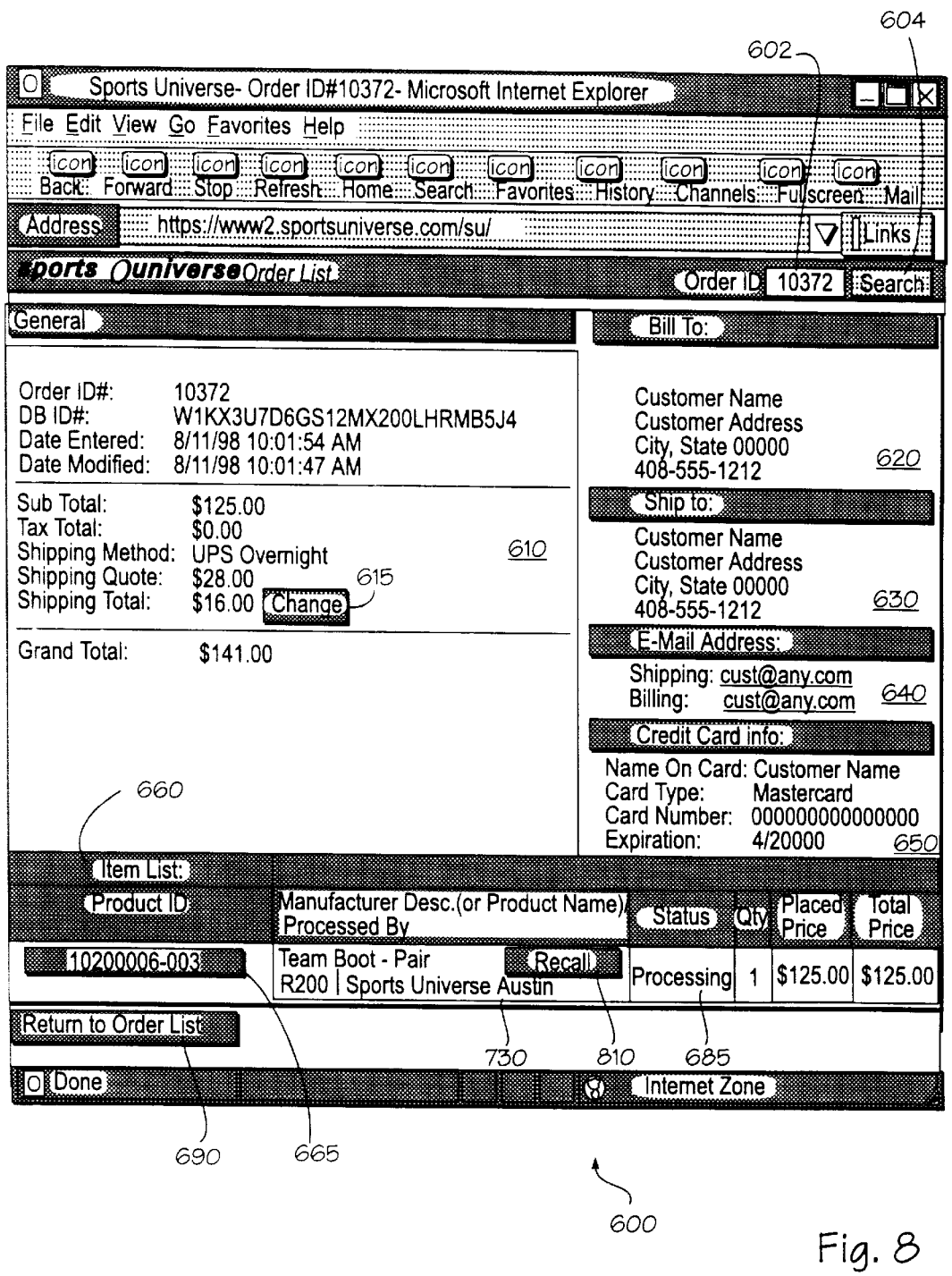

FIG. 8 illustrates order processing page 600 when an order in a processing status is displayed in item list 660. Status 685 reflects the status as processing and change button 720 is replaced by recall button 810. The operator can stop processing of the order by pressing recall button 810, causing order processing window 600 to go back to the configuration shown in FIG. 7.

FIGS. 9–15 are static images of the web pages displayed on a screen of a computer connected to a distributor computer 140 or a manufacturer computer 130 to manually carry out the functions described with respect to stages 330–342 and 354–360 of FIG. 3.

Figure 9:
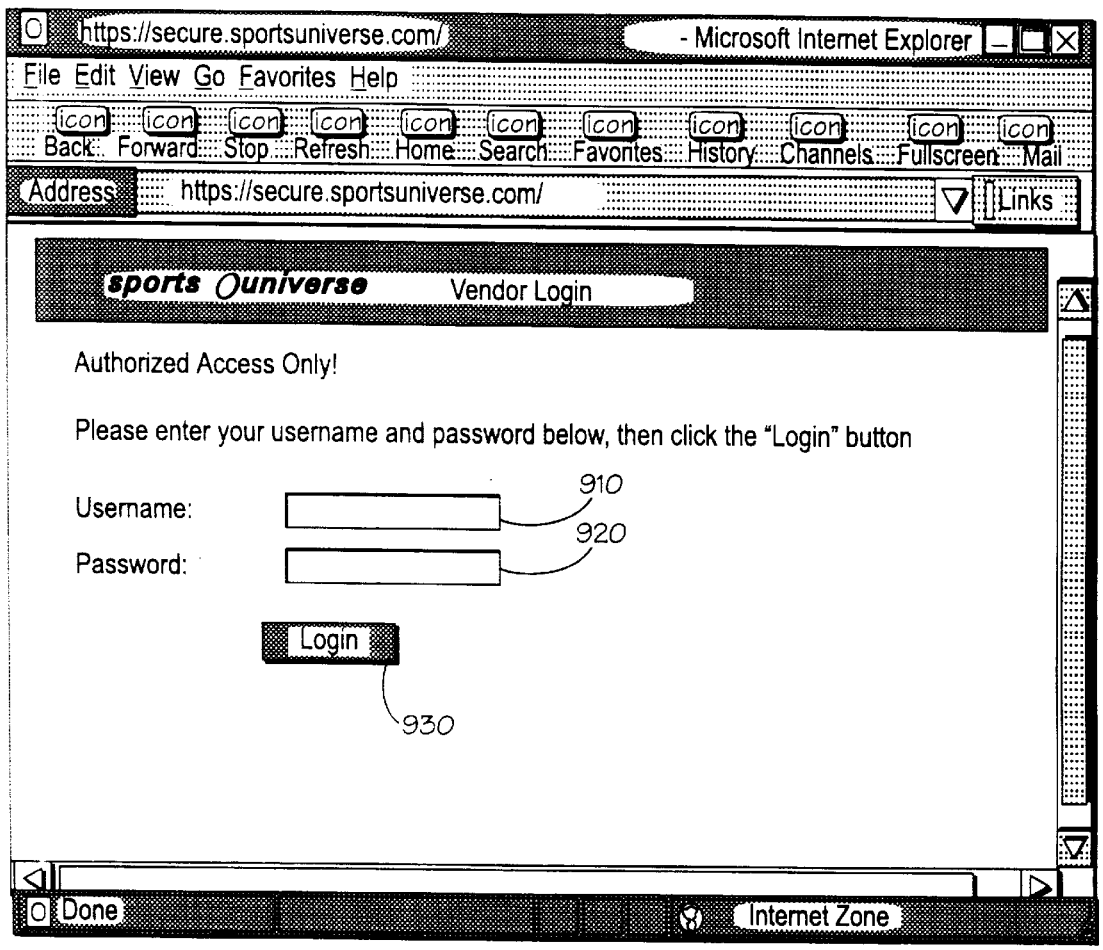
FIGS. 9–15 are static images of the web pages displayed on a screen of a computer connected to the server computer of FIG. 1 to manually carry out the order processing functions described with respect to FIG. 4.

FIG. 9 show a supplier login page 900 displayed on a screen of a distributor computer 140 or a manufacturer computer 130. As explained with respect to FIGS. 3 and 4, once a new order has been allocated to a supplier, the supplier is notified of the new order and retrieves the order information over a secure extranet communications link established over computer network 150. An operator of distributor computer 140 or manufacturer computer 130 logs onto server computer 110 via computer network 150 by entering a username into username field 910 and a password into password field 920 and then pressing login button 930. If the username and password entered by the operator are correct, supplier order list page 1000 is displayed on the screen.

Figure 10:
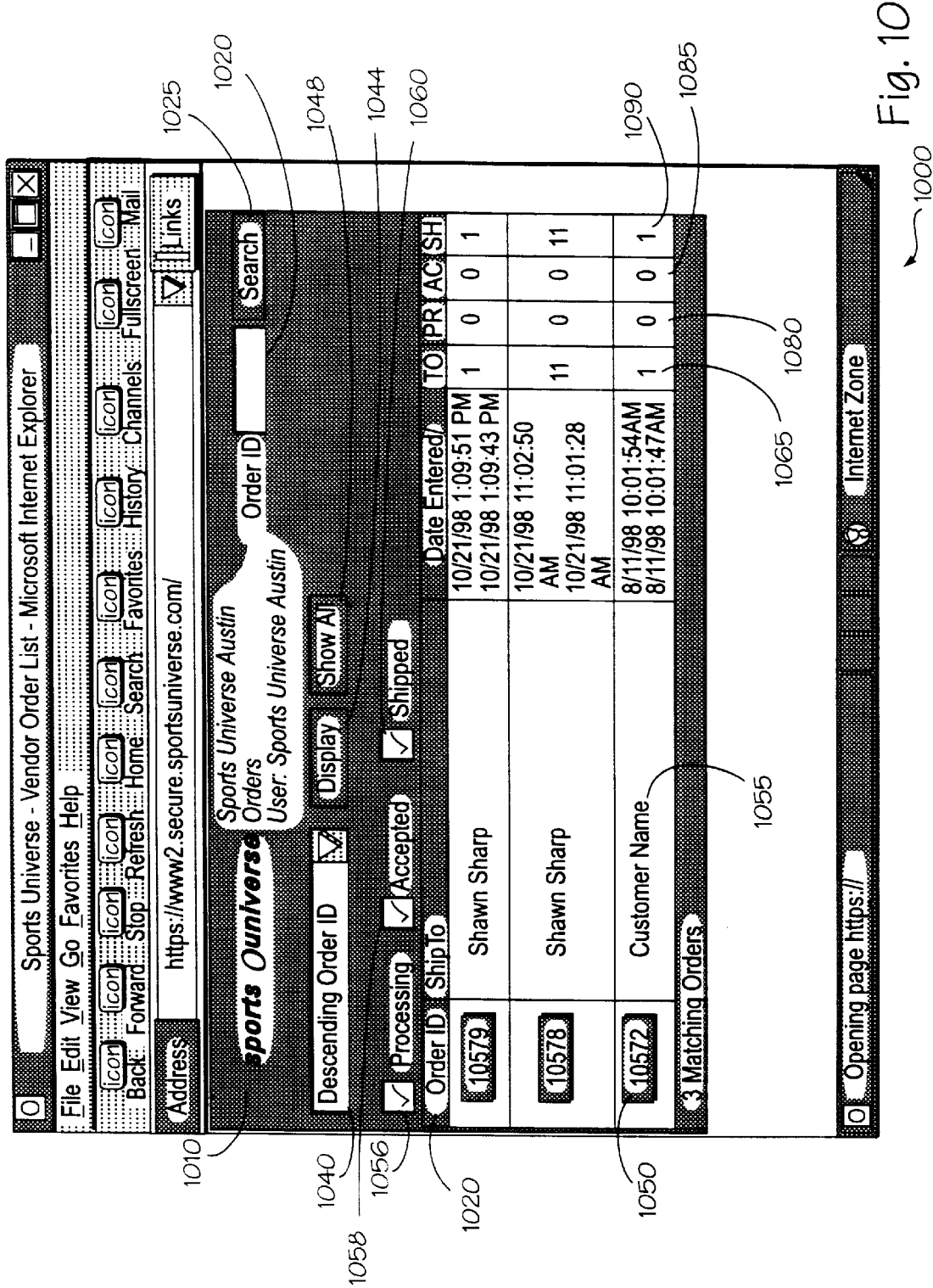

Supplier order list 1000 is illustrated in FIG. 10. Supplier order list page 500 includes a header area 1010 and a list area 1020. Header area 1010, in turn, has an order ID field 1020, a search button 1025, a sort menu 1040, a display button 1044, a show all button 1048, a processing check box 1056, an accepted check box 1058 and a shipped check box 1060. Using header area 1010, the operator controls which of the orders placed by customers and stored in database 230 are displayed in list area 1020. The operator can search for a specific order by entering an order ID in order ID field 1020 and then pressing search button 1025. Alternatively, the operator can display all orders stored in database 230 by pressing show all button 1048 or select appropriate categories of orders to be displayed by pressing any combination of check boxes 1056, 1058 and 1062 and then pressing display button 1044. The operator further controls the criteria according to which the orders displayed in list area 1020 are displayed by selecting one of the entries in sort menu 1040.

Each of the orders displayed in list area 1020 includes an order ID button 1050, a customer name 1055, a total order number 1065, a processing number 1080, an accepted number 1085 and a shipped number 1090. Thus, by displaying an order on supplier order list page 1000, the operator can quickly monitor the processing status of the order. In addition, the operator can modify the processing status of the order by pressing order ID button 1050, causing supplier order processing page 1100 to be displayed.

Figure 11:
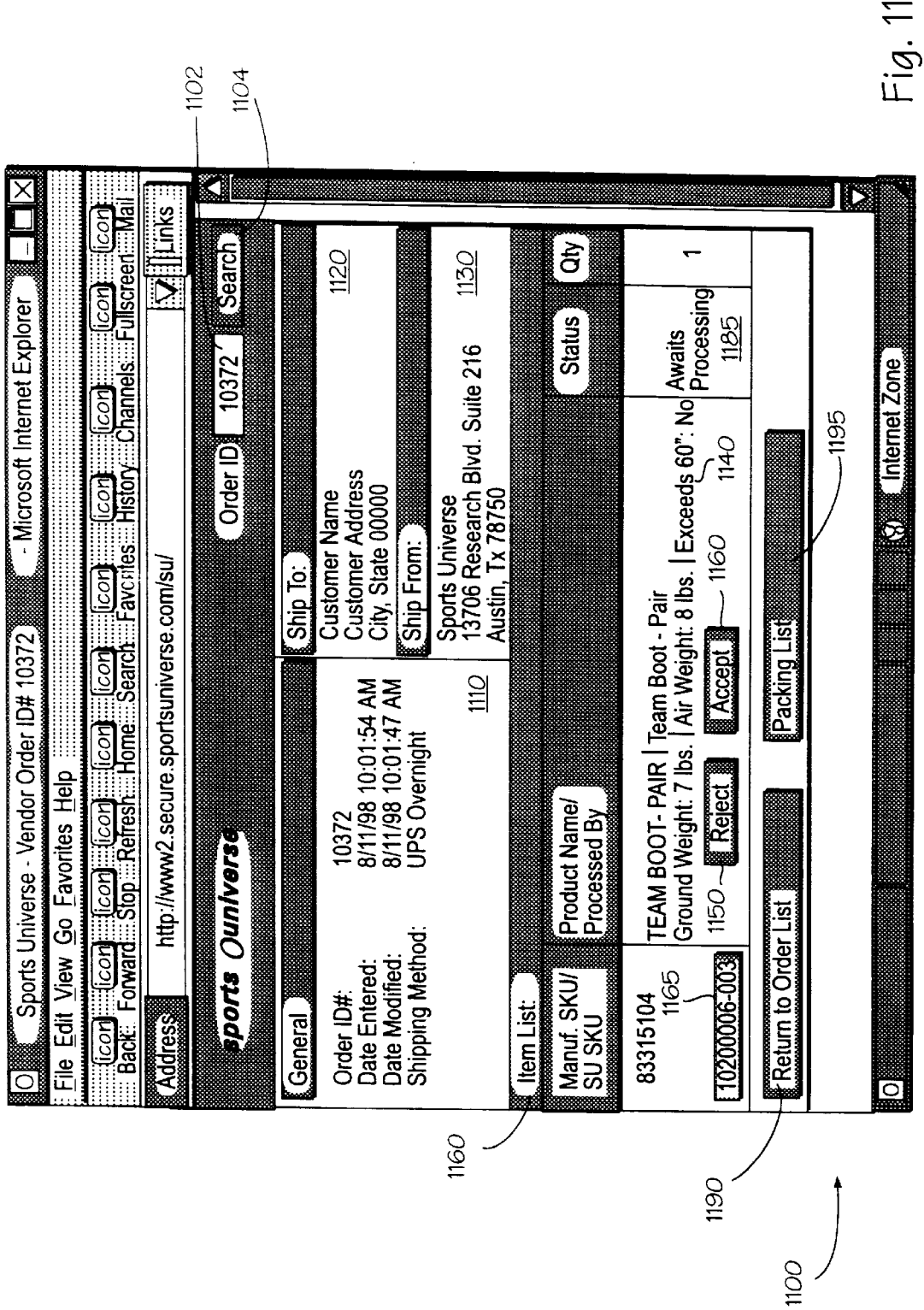

Supplier order processing page 1100 is illustrated in FIG. 11. Supplier order processing page 1100 includes a general order information area 1110, listing information such as the order ID, the date the order was entered and last modified and shipping information. In addition, supplier order processing page 1100 includes ship to address 1120, ship from address 1130 and item list 1160. Item list 1160, in turn, contains information for each of the items in the order displayed in supplier order processing page 1100. The operator can control the order displayed in supplier order processing page 1100 by entering a new order ID in order ID field 1102 and then pressing search button 1104. Item list 1160 contains a product ID button 1165 and a status 1185 for each item in the order. The operator can cause product detail page 1300 (FIG. 13) to be displayed by pressing product ID button 1165.

FIG. 11 shows order supplier order processing page 1100 when an order that is in a "awaits processing" status is displayed in status field 1185. In this configuration, supplier order processing page 1100 includes a product name 1140, a reject button 1150 and an accept button 1160. As explained in greater detail with respect to FIG. 3, the operator checks the supplier's inventory and then either accepts the order by pressing accept button 1160 or rejects the order by pressing reject button 1150. If the operator accepts the order, status field 1185 is updated, as shown if FIG. 12 Finally, the operator can go back to supplier order list page 1000 by pressing order list button 1190 at any point during the processing of the order. Alternatively, the operator can access packing list page 1500 (FIG. 15) by pressing packing list button 1195.

Figure 12:
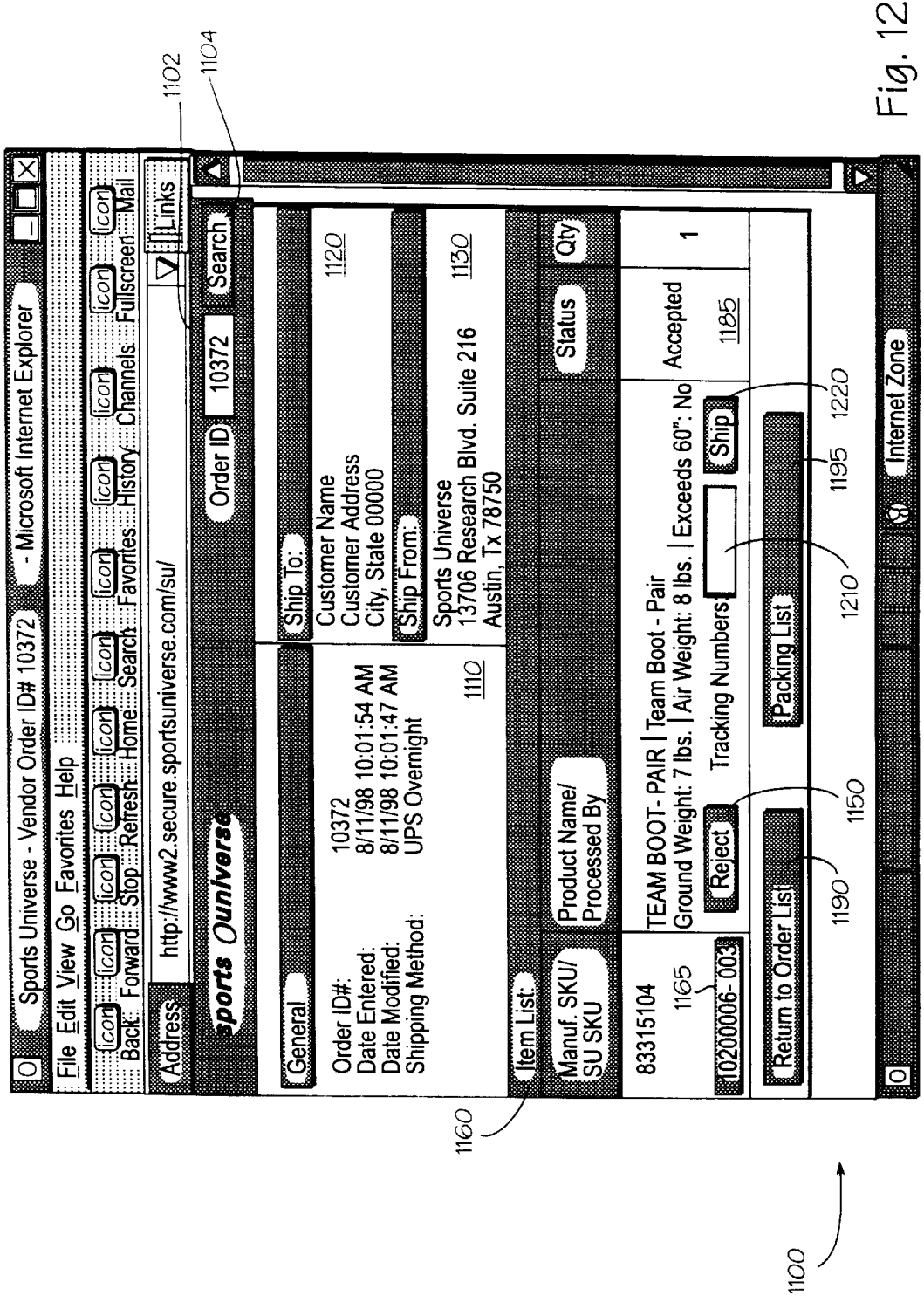
Figure 14:
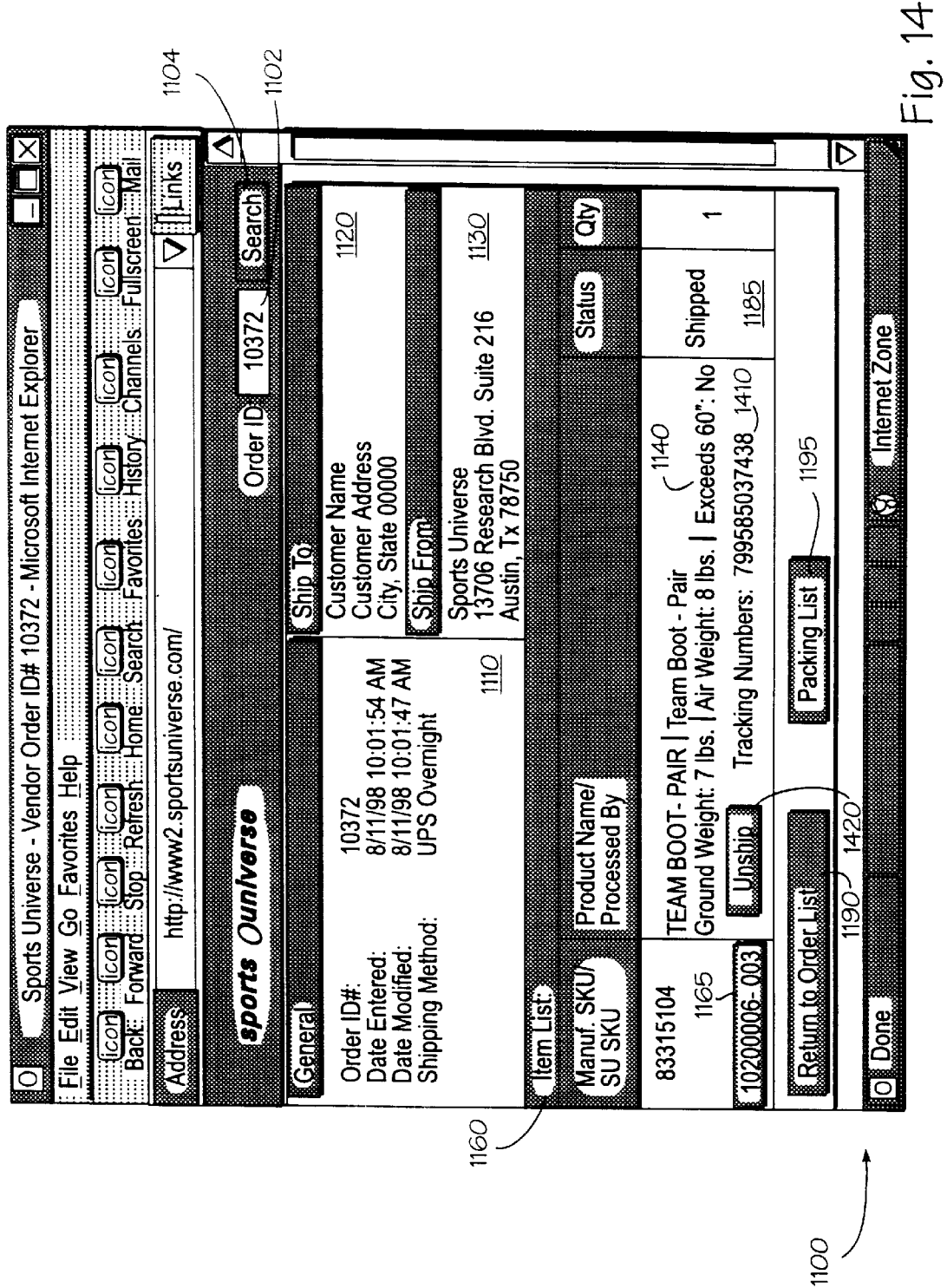

FIG. 12 shows supplier order processing page 1100 when an order that is in a "accepted" status is displayed in status field 1185. Once the order has been accepted, the operator arranges for a shipping company to pick up the package, enters a shipping tracking number in tracking number field 1210 and then presses ship button 1220, causing status field 1185 to be updated, as shown in FIG. 14. Alternatively, the operator may decide to reject the order by pressing reject button 1150, causing supplier order processing page 1100 to revert to the configuration of FIG. 11.

Figure 13:
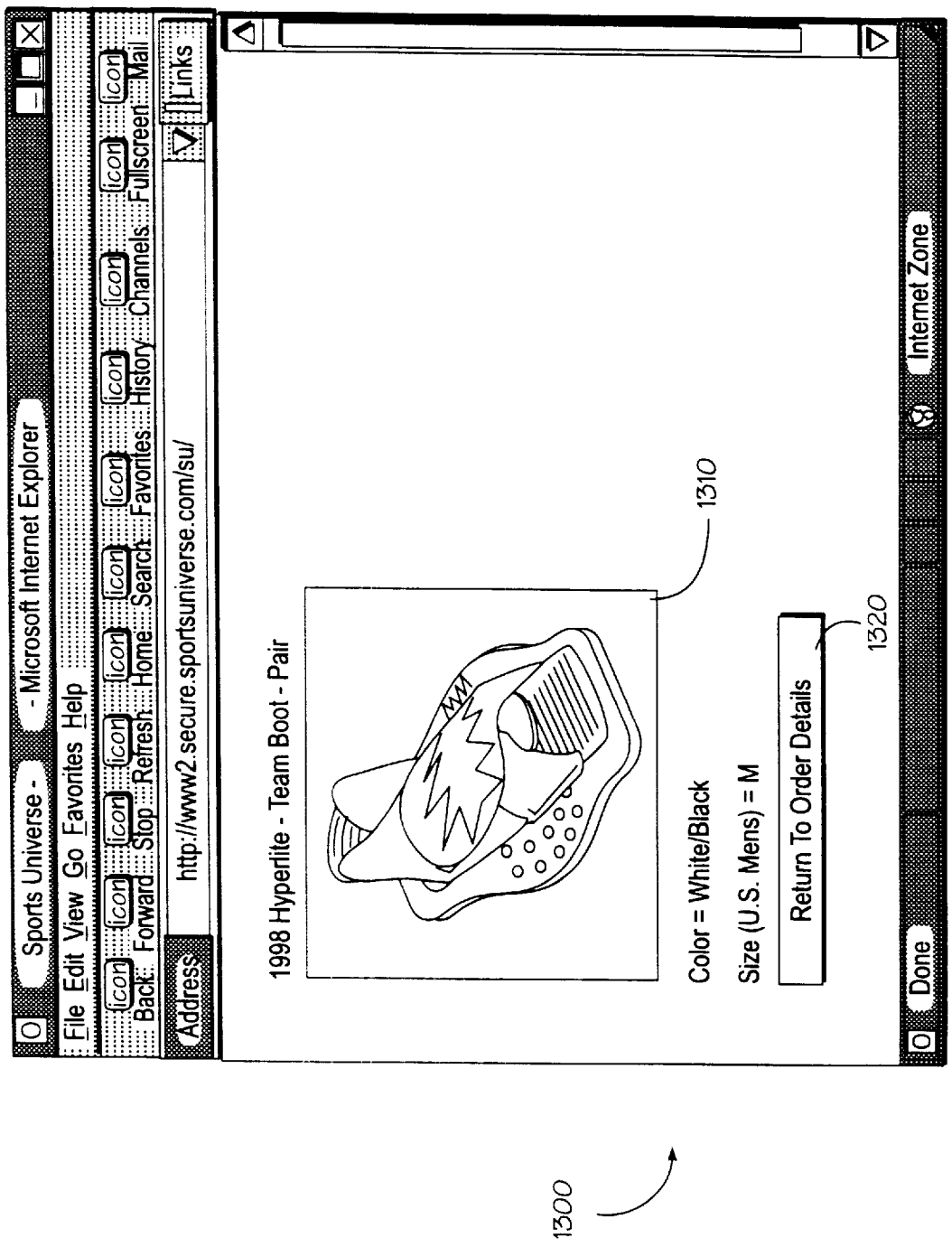

FIG. 13 illustrates product detail page 1300, which includes a product image 1310 and an order detail button 1320. By pressing the order detail button, the operator can go back to order processing page 600 or supplier order processing page 1100.

FIG. 14 shows supplier order processing page 1100 when an order that is in a "shipped" status is displayed in status field 1185. Once the order has been shipped, a shipping tracking number is displayed in tracking number 1410. The operator can stop the shipment by pressing unship button 1420, causing supplier order processing page 1100 to revert to the configuration shown in FIG. 12.

Figure 15:
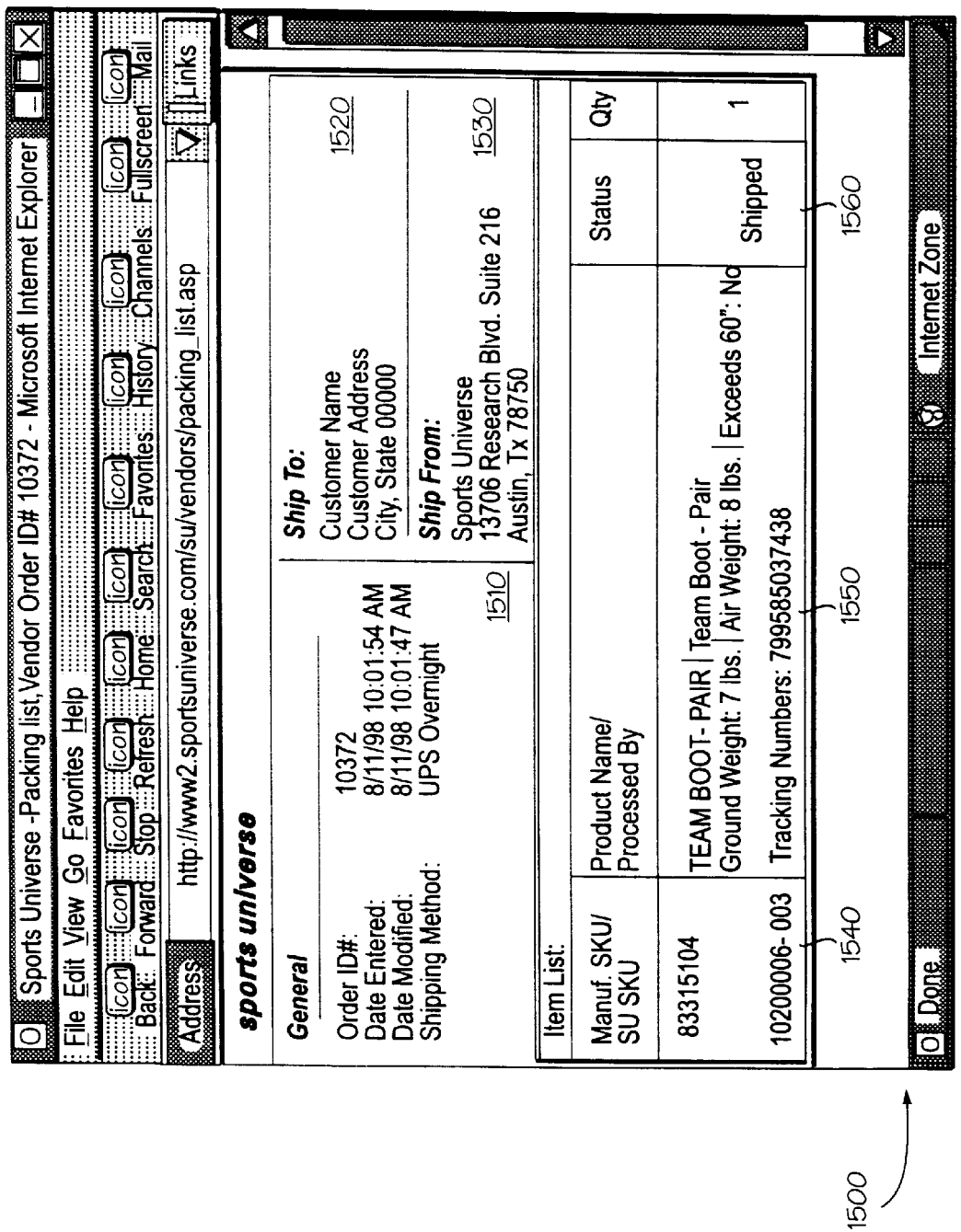

FIG. 15 illustrates packing list page 1500. Packing list page 1500 includes general information area 1510, ship to address 1520, ship from address 1530, product ID 1540, product description 1550 and status 1560. Packing list page 1500 is then printed and included in the shipment.

Figure 16:
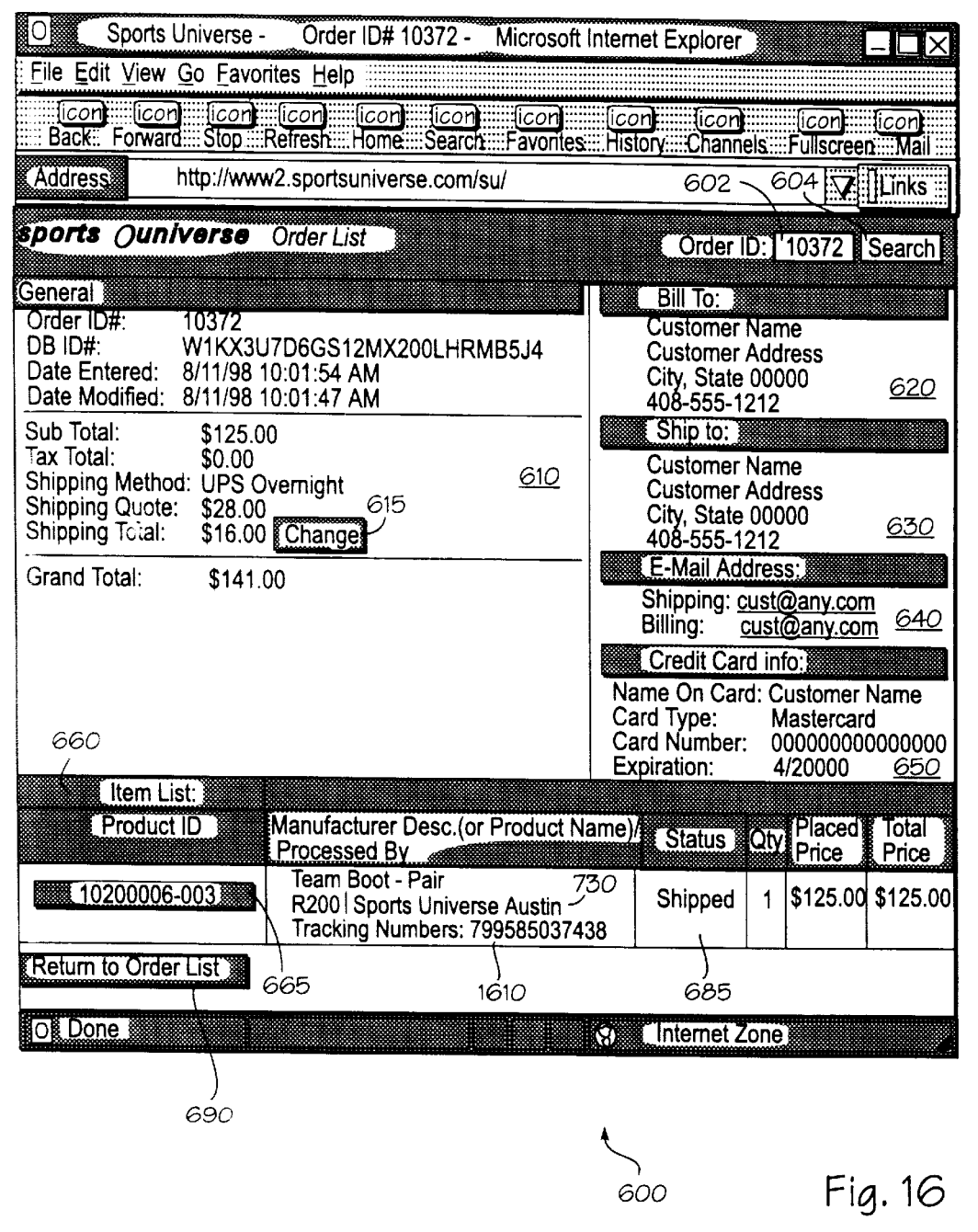

FIG. 16 illustrates order processing page 600 when an order that is in a "shipped" status is displayed in status field 685. When the order displayed in order processing page 600 is in a shipped status, shipment tracking numbers are displayed in tracking number 1610, indicating to the operator of server computer 110 that processing of the order is completed.

Embodiments described above illustrate but do not limit the invention. In particular, the invention is not limited to the appearance of the web pages described herein. Those skilled in the art realize that alternative web pages can be employed in lieu of the ones described herein in accordance to the principles of the present invention. Furthermore, the invention is not limited to any particular products or services. For example, the invention can be used to allocate orders for goods other than extreme sports equipment and apparel. Other embodiments and variations are within the scope of the invention, as defined by the following claims.

We claim:

1. A method of enabling electronic commerce on a network, the method comprising:
   receiving an order for a product from a remote client system on the network, the order placed by a user of the remote client system;
   storing information on the product locally; and
   allocating the order to a supplier of the product according to a predefined channel conflict resolution scheme.

2. The method of claim 1, wherein the channel conflict resolution scheme is predefined by a manufacturer of the product.

3. The method of claim 1, further comprising automatically processing the order.

4. The method of claim 3, further comprising allocating the customer order to a supplier according to a predefined channel conflict resolution scheme automatically.

5. The method of claim 1, further comprising tracking processing of the order.

6. The method of claim 1, further comprising:
   verifying that the order has been filled by the supplier to which the order is initially allocated; and
   upon determining that the order has not been filled by the supplier to which the order is initially allocated, allocating the order to a new supplier according to a predefined channel conflict resolution scheme.

7. The method of claim 1, further comprising tracking shipping information about the order.

8. The method of claim 1, further comprising processing payment information for the order.

9. A computer-readable storage medium comprising computer instructions for:
   allowing a user of at least one client computer to place an order for a product, wherein information on the product is stored on a server computer; and
   allocating the customer order to a supplier according to a predefined channel conflict resolution scheme.

10. The computer-readable storage medium of claim 9, wherein the channel conflict resolution scheme is predefined by a manufacturer of the product.

11. The computer-readable storage medium of claim 9, further comprising computer instructions for automatically processing the order.

12. The computer-readable storage medium of claim 11, further comprising computer instructions for automatically allocating the customer order to a supplier according to a predefined channel conflict resolution scheme.

13. The computer-readable storage medium of claim 9, further comprising computer instructions for tracking processing of the order.

14. The computer-readable storage medium of claim 9, further comprising computer instructions for:
   verifying that the order has been filled by the supplier to which the order is initially allocated; and
   upon determining that the order has not been filled by the supplier to which the order is initially allocated, allocating the order to a new supplier according to a predefined channel conflict resolution scheme.

15. The computer-readable storage medium of claim 9, further comprising computer instructions for tracking shipping information about the order.

16. The computer computer-readable storage medium of claim 9, further comprising computer instructions for processing payment information for the order.

17. A processing system comprising:
   a processor; and
   a storage facility coupled to the processor and having stored therein instructions which, when executed by the processor, configure the processing system to:
      allow a user of a remote client system to place an order for a product via a network, wherein information on the product is stored in the processing system; and
      allocate the order to a supplier according to a predefined channel conflict resolution scheme.

18. The processing system of claim 17, wherein the channel conflict resolution scheme is predefined by a manufacturer of the product.

19. The processing system of claim 17, wherein the instructions comprise instructions which, when executed by the processor, configure the processing system to automatically process the order.

20. The processing system of claim 19, wherein the instructions comprise instructions which, when executed by the processor, configure the processing system to allocate the order to a supplier according to a predefined channel conflict resolution scheme automatically.

21. The processing system of claim 17, wherein the instructions comprise instructions which, when executed by the processor, configure the processing system to track processing of the order.

22. The processing system of claim 17, wherein the instructions comprise instructions which, when executed by the processor, configure the processing system to:
   verify that the order has been filled by the supplier to which the order is initially allocated; and
   upon determining that the order has not been filled by the supplier to which the order is initially allocated, allocate the order to a new supplier according to a predefined channel conflict resolution scheme.

23. The processing system of claim 17, wherein the instructions comprise instructions which, when executed by the processor, configure the processing system to track shipping information about the order.

24. The processing system of claim 17, wherein the instructions comprise instructions which, when executed by the processor, configure the processing system to process payment information for the order.

25. An apparatus for enabling electronic commerce on a network, the apparatus comprising:
   means for receiving an order for a product from a remote client system on the network, the order placed by a user of the remote client system; and
   means for allocating the order to a supplier of the product according to a predefined channel conflict resolution scheme.

26. The apparatus of claim 25, wherein the channel conflict resolution scheme is predefined by a manufacturer of the product.

27. The apparatus system of claim 25, further comprising means for automatically processing the order.

28. The apparatus of claim 27, wherein the means for allocating comprises means for automatically allocating the order to a supplier according to a predefined channel conflict resolution scheme.

29. The apparatus of claim 25, further comprising means for tracking processing of the order.

30. The apparatus of claim 25, further comprising:

means for verifying that the order has been filled by the supplier to which the order is initially allocated; and means for allocating the order to a new supplier according to a predefined channel conflict resolution scheme upon determining that the order has not been filled by the supplier to which the order is initially allocated.

31. The apparatus of claim 25, further comprising means for tracking shipping information about the order.

32. The apparatus of claim 25, further comprising means for processing payment information for the order.

33. An apparatus for enabling electronic commerce on a network, the apparatus comprising:

means for receiving an order for a product from a remote client system on the network, the order placed by a user of the remote client system;

means for storing information on the product locally;

means for allocating the order to a supplier of the product according to a predefined channel conflict resolution scheme;

means for automatically processing the order;

means for tracking processing of the order, including means for verifying that the order has been filled by the supplier;

means for allocating the order to a new supplier according to a predefined channel conflict resolution scheme upon determining that the order has not been filled by the supplier; and means for processing payment information for the order.

34. The apparatus of claim 33, wherein the channel conflict resolution scheme is predefined by a manufacturer of the product.

35. The apparatus of claim 33, wherein the means for allocating comprises means for automatically allocating the order to a supplier according to a predefined channel conflict resolution scheme.

* * * * *